United States Patent Office 3,276,867
Patented Oct. 4, 1966

3,276,867
CERMET MATERIALS AND PROCESS OF MAKING
Daniel W. Brite and Kenneth R. Sump, Richland, Wash., assignors to the United States of America as represented by the United States Atomic Energy Commission
No Drawing. Filed May 5, 1964, Ser. No. 365,219
3 Claims. (Cl. 75—206)

The invention described herein was made in the course of, or under, a contract with the United States Atomic Energy Commission.

This invention deals with fuel for nuclear reactors and in particular with so-called cermet-type nuclear fuel; in this fuel either the metal or the ceramic or both can be fissionable material. The invention also is directed to the process of making such fuels.

In the fuels just described, it is desirable to have the metal as the continuous phase in order to have a material of good heat conductivity. To accomplish this result, it had been considered necessary heretofore that the metal be used in an amount greater than that of the ceramic present.

In most instances, the ceramic of the cermet is the fissionable material, while the metal is nonfissionable and has a high heat conductivity. If, for the sake of heat conductivity, the metal is used in an amount greater than that of the ceramic, the fuel proper is too "dilute" and necessitates the construction of too bulky a reactor, or else excessive fuel enrichment.

It is an object of this invention to provide a cermet fuel for nuclear reactors in which the ceramic is present in a larger quantity than the metal and yet the metal forms the continuous phase.

It is another object of this invention to provide a cermet fuel for nuclear reactors which, because the metal is the continuous phase, has a high degree of heat conductivity.

It is also an object of this invention to provide a cermet fuel for nuclear reactors which, because the metal is the continuous phase, is relatively nonbrittle and can be machined.

It is still another object of this invention to provide a cermet fuel for nuclear reactors which has an extremely high density, usually from 95% to above 99% of the theoretical density, and which does not show as much recrystallization or grain growth during use in the reactors as do the customary cermet fuels.

It is another object of this invention to provide a cermet fuel for nuclear reactors that, because of its high density, has a good retention of fission products and in particular of fission-product gases.

It is also an object of this invention to provide a cermet fuel for nuclear reactors that has a great dimensional stability even under high coolant pressure and after high "burnup" of fissionable material.

It is finally also an object of this invention to provide a cermet fuel for nuclear reactors that can be made at temperatures below that at which reaction between the ceramic and the metal occurs.

It was found that the relative particle size of the metal and the ceramic has a great bearing in the structure of the cermet obtained and in particular on whether the metal or the ceramic is the continuous phase, and it was ascertained that, if the metal particles are of considerably smaller size than those of the ceramic component and the mixture is compacted by a high-energy, high-rate pressure, the metal is the continuous phase in the final product. This was found to be true even when the metal was present in the cermet in an essentially lesser quantity than that of the ceramic component.

As has been mentioned in the introduction, nonfissionable metals of good heat conductivity are preferred for the product of this invention. Tungsten, molybdenum, iron, stainless steel, nickel, chromium or nickel-chromium alloys, niobium, vanadium, beryllium and tantalum have been found to be satisfactory. The ceramics to be combined with these metals are the dioxide, sulfide, nitride and carbide of uranium, plutonium or a mixture of the two. The metal quantity found suitable was between 5 and 50% by volume of the mixture; however, a quantity of about 35 v/o was preferred.

While the particle sizes of the ceramic and the metal may vary very widely as long as that of the metal is considerably smaller than that of the ceramic, it has been found that best results are obtained with a particle size of between 1 and 50 microns for the metal and of between 75 and 200 microns for the ceramic.

The powders of ceramic and metal are thoroughly mixed and then preferably loaded into a container or can which is provided with a tube for evacuation; the assembly is then evacuated and at the same time heated to below reaction temperature of the two powders. Evacuation is necessary to remove any gases that might otherwise cause an undesirable high internal pressure and cracking of the can. The heated and evacuated container is then subjected to a compaction process, preferably by a high-energy, high-rate compactor. If one or the other component of the mixture is pyrophoric, mixing under an inert atmosphere, such as of argon or helium, is desirable. The material of the container or can should be chosen so that it does not react with the powders of the mixture and that it has a high melting point. Stainless steel was found to be particularly well suitable as the container material for temperatures up to 1250° C. in oxidizing atmospheres. Tantalum and molybdenum can be used for temperatures up to 1700° C. with a protective atmosphere. A lid is placed and welded onto the container prior to compaction. In the case of plutonium or plutonium-containing compounds as the fissionable material, it was found advantageous to use an assembly of two concentrically arranged cans to avoid the escape of plutonium-containing particles.

Heating of the container is accomplished in a furnace pre-heated to the proper temperature; this step can be carried out in an atmosphere of air. The temperature best suitable for most cermet combinations tested and containing the materials enumerated above is within the range of between 1100 and 1250° C. The cans should be held in the furnace for a sufficiently long time to allow the center of the mixture to reach furnace temperature. Cans, for instance, having a diameter of 2½ inches, a length of 4 inches, a wall thickness of 25 mils and containing from 3 to 4 pounds of uranium dioxide required a heating period of between 20 and 30 minutes, while 4-inch diameter, 6-inch-long cans holding between 12 and 16 pounds of uranium dioxide needed one hour of heating in the furnace.

The heated cans are removed from the furnace; immediately the evacuation tube is cut off and the cans are sealed tight by crimping to retain the vacuum. Thereafter the container is ready for compaction.

While any apparatus known in the art for high-energy, high-rate compaction can be used for this purpose, the so-called Dynapak machine was found to be particularly well suitable for the purpose of this invention. This machine uses a high-velocity, 2000-pound ram and has a 5000-pound bolster in which a die is arranged for receiving the can. A punch is attached to the ram which is linked to a piston in a high-pressure gas cylinder through a shaft. A trigger valve located at a diaphragm separating the two halves of the cylinder can be opened rapidly to admit up to 2000 p.s.i. of nitrogen to the upper face of the piston. The piston is propelled downwardly at high velocity, while at the same time the bolster rises with a momentum that is equalized by the tie rods connecting it to the upper end of the cylinder. With a machine of this type, up to 145,000 foot-pounds can be delivered to the specimen in the die. The velocity of the ram as to the bolster at the time of impact may be as great as 800 inches per second; the pressure needs to be applied to the specimen for a few milliseconds only, for instance for six milliseconds.

The machine is activated by pumping hydraulic fluid into the cylinder beneath the piston, thus forcing the nitrogen into the upper half of the cylinder. The trigger valve is closed, the hydraulic fluid is drained from the cylinder, leaving sufficient gas pressure beneath the piston to support the weight of the ram. The Dynapak machine is then ready for a new operation.

The pressures used varied between 250,000 and 400,000 p.s.i.; they were measured with calibrated strain gauges attached to the punch. The punch was either made of tungsten carbide bonded with 25% cobalt or, if the lower pressure impacts within the specified range were used, a less costly punch of tool steel was employed. The temperature for impaction was the same as that for the preheating step, usually about 1200° C.

After the compaction step and cooling, the container is opened by machining the ends off in a lathe; the body of cermet can then be removed from the can. This body can be machined to the shape desired of the fuel element, or else it can be disintegrated into particles.

The invention is readily adapted to the fabrication of sandwich fuel material, or even a completely jacketed fuel element, by the simple expedient of filling the can initially in discrete layers or zones of particles of different materials. For example, a sandwich fuel material can be obtained by filling the can first with a bottom layer of the metal powder, then an intermediate layer of the above-described powdered mixture, and then a top layer of the metal powder. An excellent bond is obtained between the sandwich layers and the interface in the bonding region cannot even be detected. Further, materials that are incompatible at high temperatures can be bonded together because the temperatures required are comparatively low.

In fabricating a completely jacketed fuel element, it is, of course, necessary to pretamp or prepress somewhat the powdered layers in some way so as to maintain a discrete annular zone of the powdered metal along the vertical wall of the can, while the inner zone is being filled with the powdered mixture. A convenient way of accomplishing this is by loading a cylindrical mold, for instance of mild steel, with powdered metal intended for the jacketing or cladding materials; this powder is pressed into said mold at room temperature using a low pressure. The body to be obtained is then provided with an incomplete axial bore by drilling, and the bore is filled with the core material of this invention. The core material is then pressed at room temperature and low pressures, and the empty space obtained thereby at the end is then filled with a layer of powdered cladding metal, which is also pressed at room temperature and low pressure. Thereafter, the entire assembly of mold, core, and cladding is placed in the impaction can, and the can and its contents are treated in the manner described above.

The main advantage in using the process of the immediately preceding paragraph for simultaneously producing the core and cladding is that both parts are compressed at an even rate and pressure, so that there are no stresses or strains in the body obtained.

The following table summarizes a number of cermet combinations, all of which have been prepared by the process of this invention using uranium dioxide as the ceramic.

| Metal | Metal Grain Size | Percent Metal Metal by Volume | $UO_2$ Grain Size, Mesh |
|---|---|---|---|
| Tungsten | <10μ | 20 | −65 +200 |
| Do | <10μ | 28 | −65 +200 |
| Do | <10μ | 36 | −65 +200 |
| Molybdenum | −325 mesh | 35 | −65 +200 |
| Stainless Steel | −325 mesh | 35 | −65 +200 |
| Ni-20 w/o Cr | −325 mesh | 35 | −65 +200 |
| Iron | −325 mesh | 35 | −65 +200 |

In all the above instances strong, satisfactory cermets were obtained in which the metal was the continuous phase. They can be machined and can be welded by techniques applicable to the metallic constituent. Machinable cermets can be produced with as little as 5% by volume of metal when the metal powder of a grain size less than 10 microns is used. Even in this small proportion, the metal phase was continuous through a large part of the cermet.

When, on the other hand, 20 parts by volume of stainless steel having a grain size of −325 mesh was mixed with 80 parts by volume of uranium dioxide whose grain size was 5 microns and processed as described and claimed, a product was obtained in which the uranium dioxide was the continuous phase and which was very brittle.

As mentioned, similar, equally satisfactory compounds can be made by using uranium nitride, uranium sulfide, uranium carbide, plutonium dioxide, plutonium dioxide-uranium dioxide, plutonium nitride, plutonium carbide or any mixture thereof as the ceramic and by using nickel, chromium, niobium, vanadium, beryllium or tantalum as the metal.

Because of its extremely high melting point, tungsten is particularly advantageous as the metal. Tungsten-$UO_2$ cermets fabricated by the method set out above are excellent nuclear fuels for high-temperature operation. Tungsten-$UO_2$ cermets clad in tungsten are satisfactorily produced by using the two-zone method described above.

Particularly at very low metal contents, improved results are secured by utilizing ceramic particles which have been coated with metal. For example, uranium dioxide particles of −250 +400 mesh can be coated with a layer of tungsten a few microns thick by vapor deposition. This coated powder can be mixed with enough tungsten powder of a particle size less than 10 microns to give a final content of 15% by volume of tungsten and can then be impacted, whereby a cermet having a continuous tungsten phase throughout is obtained.

The cermets can be furthermore strengthened by the inclusion of fine wires in addition to the powder. For example, ½-inch lengths of tungsten wire having a diameter of .005 inch or less, preferably of .001 inch, can be included along with uranium dioxide (−325 mesh) and tungsten powder (less than 5 microns). It has been found that by the wires the propagation of cracks is substantially prevented.

While the invention has been described for the production of nuclear cermet fuel, it is also applicable to the preparation of cermet materials of other compositions and for other purposes. For instance, it can be used for the preparation of cutting or abrading tools in which tungsten carbide, silicon carbide or the like is embedded in a matrix of soft metal.

It will be understood that the invention is not to be limited to the details given herein but that it may be modified within the scope of the appended claims.

The embodiments of the invention in which an exclusive property or privilege is claimed are defined as follows:

1. A process of making a cermet-type composition of matter, comprising mixing a metallic material selected from the group consisting of tungsten, molybdenum, iron, stainless steel, nickel, chromium, nickel-chromium alloys, niobium, vanadium, beryllium and tantalum with a ceramic selected from the group consisting of the dioxide, sulfide, nitride and carbide of uranium, plutonium and mixtures of uranium and plutonium in such ratios that the metallic material is from about 5 to 50 volume percent of the mixture, said metallic material having a particle size of between 1 and 50 microns and said ceramic having a particle size of between 75 and 200 microns; charging the mixture into a metal container, said container being fabricated from a material which is essentially non-reactive with the mixture and has a melting point in excess of the process temperature; evacuating and closing said container; heating said container to from 1100 to 1250° C.; compacting said heated container by a high-energy, high-rate pressure; cooling the compacted assembly; and removing the container from the cermet product.

2. The process of claim 1 wherein the compacting pressure ranges between 250,000 and 400,000 p.s.i.

3. The process of claim 2 wherein the metallic material is present in a quantity of about 35% by volume.

References Cited by the Examiner

UNITED STATES PATENTS

| | | | |
|---|---|---|---|
| 2,934,482 | 4/1960 | Brooks | 75—208 X |
| 2,947,080 | 8/1960 | Kates et al. | |
| 2,978,399 | 4/1961 | Silverman et al. | 252—301.1 |
| 2,993,786 | 7/1961 | Roboff et al. | 75—226 X |
| 3,012,951 | 12/1961 | Storcheim | 75—206 X |
| 3,091,581 | 5/1963 | Barr et al. | 75—212 X |
| 3,117,914 | 1/1964 | Wright et al. | 75—206 X |
| 3,167,427 | 1/1965 | Slayter | 75—201 |
| 3,173,785 | 3/1965 | Manganello | 75—201 |
| 3,207,697 | 9/1965 | Benesovsky et al. | 252—301.1 |

L. DEWAYNE RUTLEDGE, *Primary Examiner.*

LEON D. ROSDOL, *Examiner.*

R. L. GRUDZIECKI, *Assistant Examiner.*